United States Patent

[11] 3,562,418

[72] Inventors Robert E. Glusick; Daniel C. Osborn, N. Syracuse; Richard D. Stewart, Camillus, N.Y.

[21] Appl. No 599,126
[22] Filed Dec. 5, 1966
[45] Patented Feb. 9, 1971
[73] Assignee General Electric Company a corporation of New York

[54] SOLID STATE IMAGE CONVERTER SYSTEM
12 Claims, 7 Drawing Figs.

[52] U.S. Cl. 178/6, 340/166
[51] Int. Cl. H04n 5/74
[50] Field of Search 178/7.3D, 6, 7.5D, 7.2; 250/211J; 315/169TV; 313/108B; 340/166, 173

[56] References Cited

UNITED STATES PATENTS

| | | | |
|---|---|---|---|
| 3,039,013 | 6/1962 | Wilmotte | 315/169 |
| 3,378,688 | 4/1968 | Kabell | 250/211 |
| 3,400,272 | 9/1968 | Dym et al. | 250/211 |
| 3,397,325 | 8/1968 | Weimer | 340/166 |

*Primary Examiner*—Richard Murray
*Assistant Examiner*—Barry L. Leibowitz
*Attorney*—Marvin A. Goldenberg, Richard V. Lang, Melvin M. Goldenberg, Frank L. Neuhauser and Oscar B. Waddell

ABSTRACT: An image converter system of solid state construction which includes an image sensor matrix of nonlinear photosensitive means having charge storage properties which are varied as a function of applied light energy, the photosensitive means being sequentially interrogated through a direct low impedance path electrical connection made to the matrix for detecting said charge storage properties and generating a corresponding video output signal. Said photosensitive means each includes a photoconductor element in shunt with a storage capacitor, the pair being connected in series with a diode element. A backward bias voltage is applied across said diode elements for placing them in a normally back-biased condition, a forward bias voltage being sequentially applied to said diode elements during interrogation of the photosensitive means.

INVENTORS:
ROBERT E. GLUSICK,
DANIEL C. OSBORN,
RICHARD D. STEWART,
BY Marvin L. Goldenberg
THEIR ATTORNEY.

INVENTORS:
ROBERT E. GLUSICK,
DANIEL C. OSBORN,
RICHARD D. STEWART,

BY Marvin L. Goldenberg

THEIR ATTORNEY.

SOLID STATE IMAGE CONVERTER SYSTEM

The invention relates to light image converters and, in particular, to a novel solid state image converter system having operational characteristics comparable to a vidicon system. The invention described herein was made in the performance of work under a NASA contract and is subject to the provisions of section 305 of the National Aeronautics and Space Act of 1958, Public Law 85, 568 (72 Stat. 435; 42 U.S.C. 2457).

For many years workers in the art have been seeking to eliminate the need for electron beam devices in television camera equipments. Electron beam devices are obviously undesirable in that they are of considerable bulk and weight, require a vacuum, are fragile and have high voltage requirements. Recently, there have been developed photosensitive matrices which have the capability for being scanned by a direct electrical connection. The photosensitive components of the matrix are individually and sequentially scanned by energizing pairs of coordinant conductors across which said photosensitive components are connected. In the existing systems, a video output signal is generated in response to an interrogation of the steady state current flowing through individual photosensitive elements, the current being a function of the impedance of said components. However, such systems have relatively poor signal-to-noise characteristics, and both the sensitivity and rate of operation capability is below that required for achieving performance comparable to conventional vidicon and image orthicons.

Accordingly, it is an object of the present invention to provide a novel image converter system which does not require an electron beam device but which performs in comparable fashion to conventional television cameras.

It is a further object of the invention to provide an image converter system as above described which is entirely of a solid state construction.

It is another object of the invention to provide an image converter system as described which employs a uniquely constructed matrix of photosensitive components generating a video output signal having a signal-to-noise ratio orders of magnitude greater than that obtained with prior art photosensitive matrices, and capable of operating at conventional television frequencies.

These and other objects of the invention are accomplished by employing an image converter system of solid state construction which includes an image sensor matrix of nonlinear photosensitive means having charge storage properties which are discretely varied as a function of applied light energy, and which are sequentially interrogated through a direct electrical connection to the matrix for detecting said charge storage properties so as to generate a corresponding video output signal.

In one preferred embodiment of the invention the nonlinear photosensitive means each include a photoconductor element having in shunt therewith a storage capacitor, the shunt pair connection being in series with a diode element. The capacitors discharge through the associated photoconductors as a function of the applied illumination during relatively long noninterrogation periods and are charged through a low impedance current detecting path during extremely short interrogation periods.

In accordance with a further aspect of the invention a backward bias voltage is applied across the diode elements of the matrix so as to place them in a normally back-biased condition. A forward bias voltage being applied to the diode elements for providing the interrogation of the photosensitive means.

The specification concludes with claims particularly pointing out and distinctly claiming the subject matter which is regarded as the invention. It is believed, however, that both as to its organization and method of operation, together with further objects and advantages thereof, the invention may be best understood from the following description taken in connection with the accompanying drawings in which:

Figure 1:
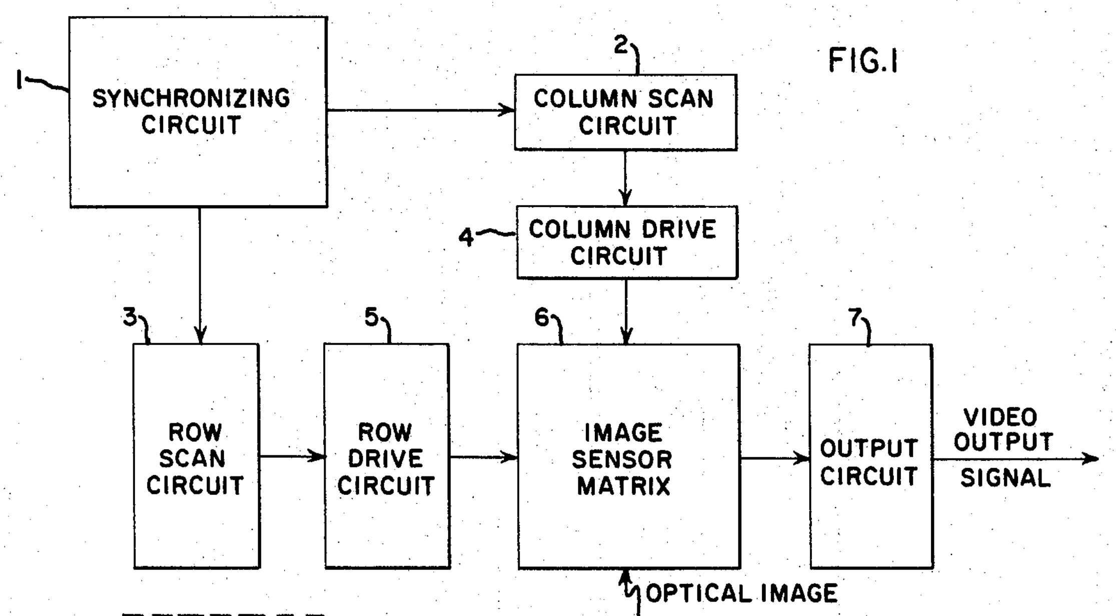
FIG. 1 is a block diagram of a solid state image converter system in accordance with the invention.

Referring to FIG. 1 there is shown, in block diagram outline, a solid state image converter system in which an applied optical image may be transformed into a corresponding electrical video signal, the system having operational characteristics corresponding to a conventional television vidicon system. A synchronizing circuit 1 of conventional design controls both a column scan circuit 2 and row scan circuit 3. In turn the column and row scan circuits control column and row drive circuits 4 and 5, respectively. The column and row drive circuits are coupled to an image sensor matrix 6 which includes an array of photosensitive means individually and sequentially scanned, typically in a line sequence, so as to generate an electrical video output signal from output circuit 7 which corresponds to the applied optical image.

Figure 2:
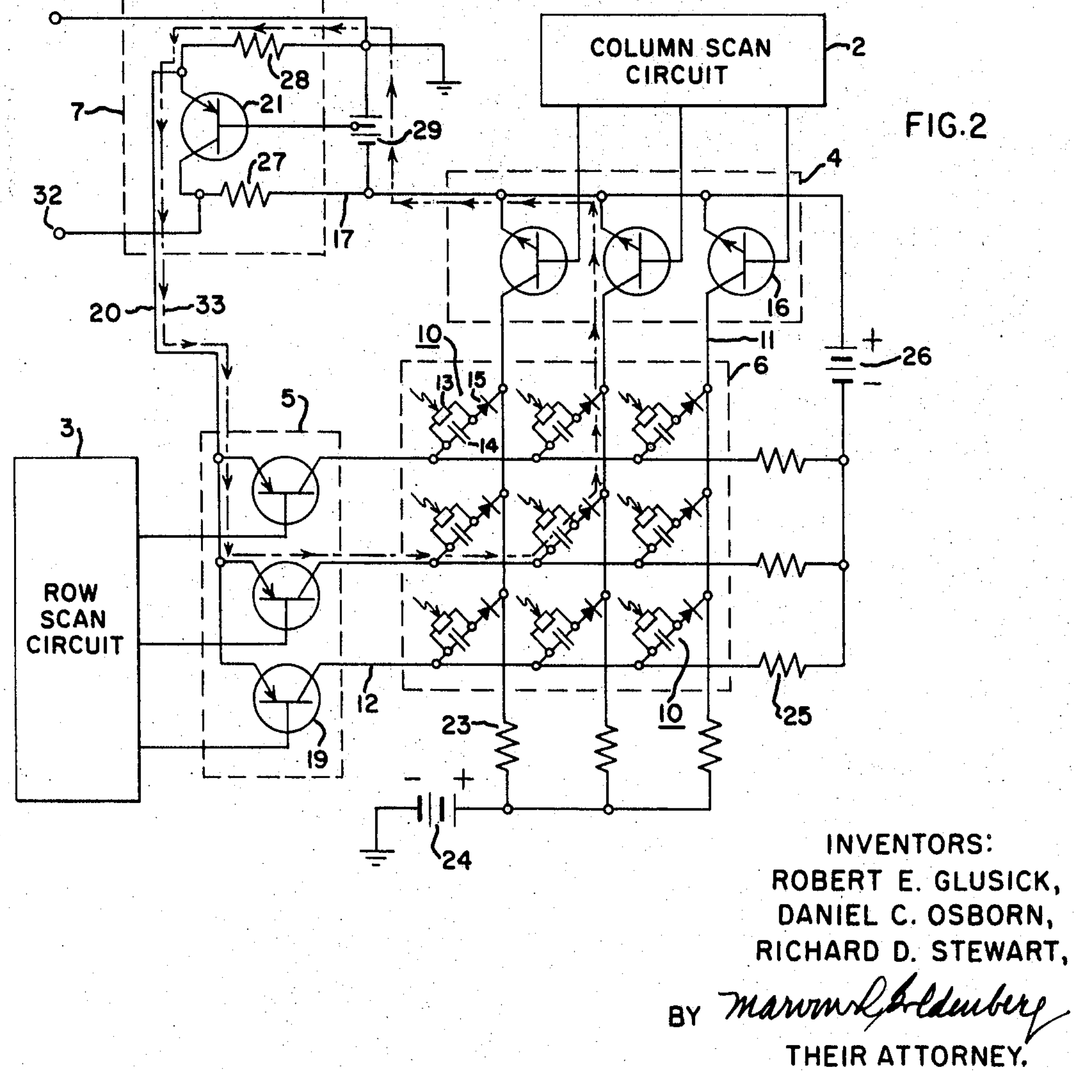
FIG. 2 is a schematic circuit diagram of the image converter system shown in FIG. 1.

In FIG. 2 there is illustrated the circuit details of the image sensor matrix 6, the column and row drive circuitry 4 and 5 and the output circuit 7. The matrix 6 includes an array of nonlinear photosensitive components 10 connected across the intersections of a plurality of column conductors 11 and a plurality of row conductors 12. Each photosensitive component 10 includes a photoconductor element 13 in shunt with a capacitor 14, the photoconductor-capacitor shunt pair being connected in series with a diode element 15. In the embodiment illustrated, the anode electrodes of the diode elements 15 are connected to the row conductors 12, the cathode electrodes being connected to one side of the photoconductor-capacitor shunt pairs and the opposite side of the shunt pairs being connected to the column conductors 11. For simplicity of illustration, the matrix 6 is shown as having nine photosensitive matrix components connected across three column conductors and three row conductors. It may be appreciated that for a typical operation the number of matrix components may extend from on the order of several hundred to several thousand and the matrix may have a square, rectangular or comparable configuration.

The column drive circuit 4 includes a plurality of switch operating NPN transistors 16, the collector electrodes of which are individually coupled to one end of the column conductors 11, the emitter electrodes being joined together and connected to a negative voltage bus 17. Control signals are applied to the base electrodes of transistor 16 from the column scan circuit 2, which may be a conventional logic component generating a multiplicity of control signals in time sequence, such as a shift register component, preferably of a microelectronic circuit construction. The row drive circuit 5 similarly includes a plurality of switch operating PNP transistors 19, the collector electrodes of which are individually coupled to one end of the row conductors 12, the emitter electrodes being joined together and connected by conductor 20 to the emitter electrode of a current detecting transistor 21 in output circuit 7. The base electrodes of transistors 19 are controlled by a connection to the row scan circuit 3, which also may be a conventional microelectronic shift register component. In order to provide a line scan of the matrix 6, the column scan circuit 2 is operated at a shift rate $n$ times that at which the row scan circuit 3 is operated, where $n$ is the number of columns in the matrix. The synchronizing circuit controls the operation of the scan circuits.

The other ends of column conductors 11 are connected through current limiting resistors 23 to the positive terminal of a source of bias voltage 24, the negative terminal of which is connected to ground. The other ends of row conductors 12 are similarly connected through current limiting resistors 25 to the negative terminal of a second source of bias voltage 26, the positive terminal of which is connected to negative bus 17. The voltage sources 24 and 26 serve to apply a backward bias voltage to diode elements 15 for the condition in which either the associated column or row transistor switch is closed, but not both. By this means crosstalk during interrogation is avoided.

The current detecting transistor 21 in output circuit 7 is of a PNP type. The emitter electrode is connected through a bias resistor 28 to ground, and the collector electrode is connected through a bias resistor 27 to the negative bus 17. The base electrode 25 is connected to a fixed tap on a source of bias voltage 29 which has its positive terminal connected to ground and its negative terminal connected to bus 17. The collector electrode of transistor 21 is also directly connected to an output terminal 32.

The emitter electrode of transistor 21 is further connected through conductor 20 to the junction of the emitter electrodes of transistors 19. Accordingly, a current path, indicated by the broken line 33, is provided from ground, through resistor 28, conductor 20, row drive circuit 5, matrix 6 and column drive circuit 4 to negative potential bus 17. The current path is closed through a selected one of matrix photosensitive components 10 by closing the pair of column and row transistor switches connected thereto. It is noted that the path 33 is, in an exemplary manner, shown to be completed through only a single photosensitive component. With the path 33 open, i.e., with no pair of columns and row switches closed, all of the current will flow through the emitter-collector path of transistor 21. With the path 33 closed, only a portion of the current flows through the transistor 21, the remainder being conducted through a selected interrogated photosensitive component with a magnitude that is determined by the degree of illumination of said component. Accordingly, the current flowing through the transistor is a function of the image sensor matrix elemental illumination.

In the operation of the circuit of FIG. 2, the photosensitive components are sequentially interrogated in a line scan format so as to derive from the output an electrical signal that corresponds to the light incident at each photosensitive component 10. Thus, the column and row scan circuits 2 and 3 in sequence close the row switches 19 and during the time each switch 19 is closed, sequentially close the column switches 16. Assuming the storage capacitors 14 to be in an initially fully charged condition, the capacitors will commence to discharge through the associated photoconductor elements 13 as a function of their impedance, which in turn is determined by the incident light energy. Thus, those photoconductor elements which have high intensity light applied exhibit a relatively low impedance and permit the capacitors to discharge appreciably. The photoconductor elements having low light or zero light intensities applied are in a high impedance state and permit the associated capacitors to discharge but slightly.

As noted, the photosensitive components 10 are individually and sequentially interrogated row by row, by the sequential closing of the column switches 16 during the time that the associated row switch 19 is closed, interrogation occuring during the brief period when both switches connected to a component are closed. In response to the switch pairs being closed, a forward bias voltage is applied across the diode elements 15 so as to sequentially complete the current path 33 through the interrogated components. The current acts to recharge the capacitor elements 14. The amount of charge required to restore the capacitor to full charge, which is the magnitude of the charge current times its duration, provides a measure of the elemental applied light intensity, ranging from a high value for capacitor elements which are in a highly discharged condition to a low value for elements which are in a slightly discharged condition. The current path 33 is provided with a low resistance and the RC time constant of the charge path is extremely low, so that the charge current can build up rapidly. Output currents corresponding to low intensity, intermediate intensity and high intensity light are shown by the waveforms A, B and C, respectively, in FIG. 3.

It is of importance to the proper operation of the circuit that the drive switches, and particularly the column switches 16, be very fast acting during closing so as to apply to the components 10 a voltage pulse having an extremely short rise time, thereby permitting the rapid buildup of the charge current. Since charge current does build up rapidly, and the RC time constant of the charge paths of the matrix are essentially constant, the peak amplitude of the charge current also provides an accurate measure of the elemental applied light intensity.

The switch opening should be relatively slow acting, e.g., an order of magnitude slower than the closing, so as to minimize noise currents in the output. Noise currents are due primarily to shunt path capacitances presented by associated matrix diode elements. It is noted that since the interrogated information is obtained predominantly during the rise time of the output pulse, the slowness of operation of the switch openings does not limit the overall system operating speed.

In one exemplary operation considered the average pulse width was on the order of 100 nanoseconds, and the average peak amplitude of the output pulses was about 5 milliamperes. The interrogation period was on the order of 200 nanoseconds, and the interval between interrogations of a single photosensitive component, corresponding to a single frame time, was on the order of 16 milliseconds. A significant advantage in the operation of the present system is that light input information to each photosensitive component is picked up over a relatively long period, i.e., the frame time, and is read out essentially instantaneously. In essence, during a frame period charge is being integrated by each matrix component, as a function of elemental applied light intensity, which charge may be read out in a small fraction of the time it takes to integrate it. Thus, there are gained extremely good signal-to-noise and high operating speed characteristics.

Crosstalk in the output from associated matrix storage components is avoided by means of the voltage sources 24 and 26 which maintain the diode elements 15 of those photosensitive components 10 which are not being interrogated in a backward bias condition, so as to restrict current flow in the noninterrogated components.

Figures 3, 4, 5, 6A:
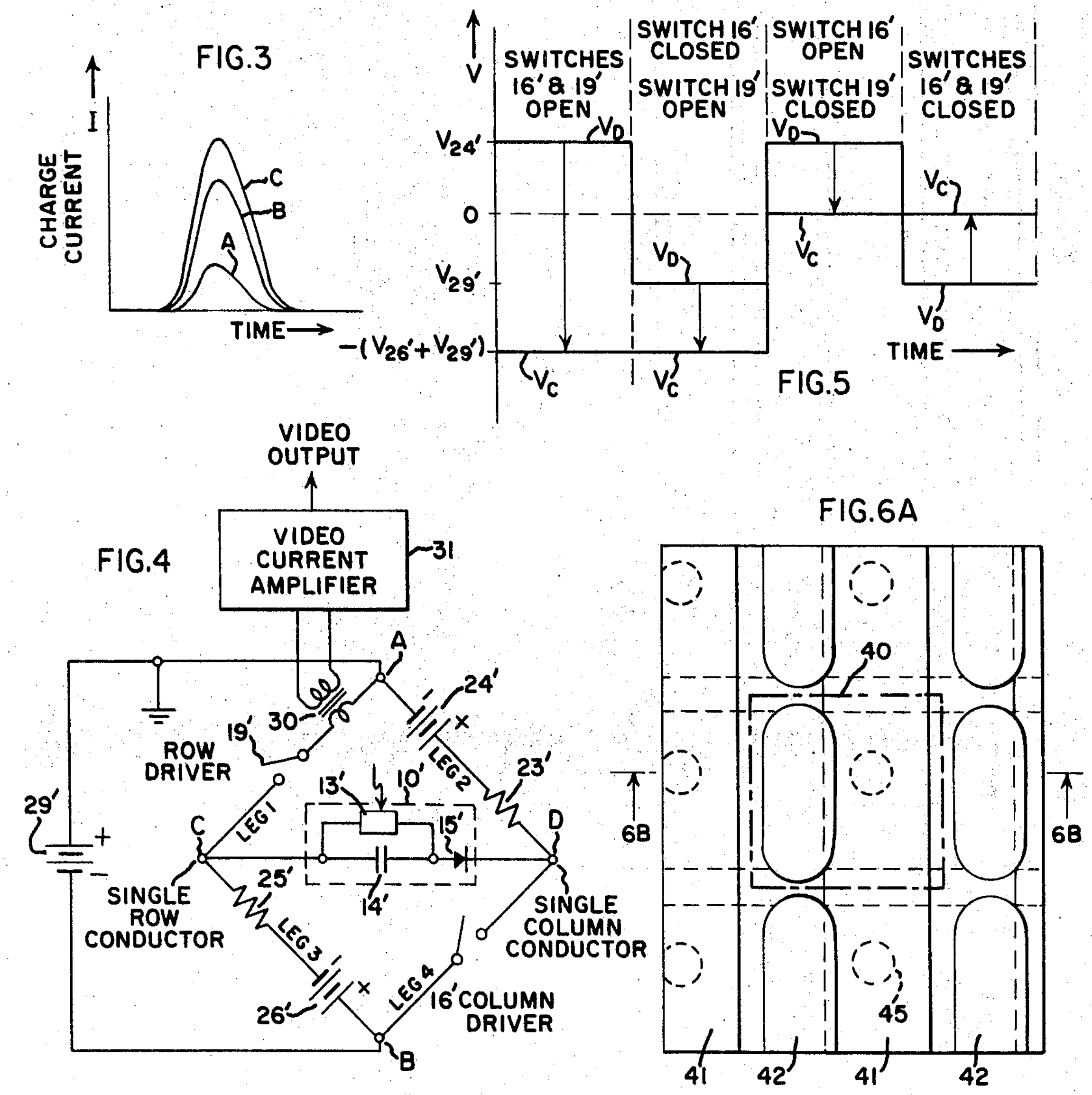
FIG. 3 is a graph of charge current waveforms applicable to the circuit of FIG. 2.
FIG. 4 is a schematic diagram of a single matrix photosensitive component of FIG. 2 in combination with its drive circuitry, employed in a description of the operation of the invention.
FIG. 5 is a graph illustrating the various bias voltages that are selectively applied to the matrix photosensitive components during interrogation and noninterrogation periods.
FIG. 6A is a plan view of an exemplary construction of the image sensor matrix of FIG. 2.

To further explain the operation involved in the interrogation of the matrix photosensitive components, reference is made to FIG. 4 which illustrates a single photosensitive component 10′ having associated components and circuit connections corresponding to that presented in the circuit of FIG. 2. The components in FIG. 4 which correspond to FIG. 2 are similarly identified but with an added prime notation.

The photosensitive component 10′ is seen to be connected in a bridge circuit configuration. A first leg includes row switch 19′ and a current sensing transformer 30 coupled to a current detector 31, the operation of which may be considered to be analogous to the current detecting transistor 21 of FIG. 2; a second leg includes voltage source 24′ and current limiting resistor 23′; a third leg includes voltage source 26′ and resistor 25′; and a fourth leg includes column switch 16′. Voltage source 29′ is connected between the grounded junction A of legs 1 and 2 and the junction B of legs 3 and 4. Junction B corresponds to negative bus 17 in FIG. 2. The photosensitive component 10′ is connected from the junction C of legs 1 and 3 to the junction D of legs 2 and 4. Junctions C and D correspond to connections to a single row and column conductor, respectively, in FIG. 2. With both the column and row switches 16′ and 19′ open, a backward bias voltage equal to the sum of the voltage sources 24′, 26′ and 29′ is placed across the diode element 15′, as shown in the graph of FIG. 5. It is seen that the voltage $V_D$ at junction D is a positive voltage equal to $V_{24}'$, and the voltage $V_C$ at junction C is a negative voltage equal to $-(V_{26}'+V_{29}')$. With only the column switch 16′ closed, corresponding to a noninterrogated component in column with the interrogated component, the diode element 15′ is back biased by the voltage source 26′. With only the row switch 19′ closed, corresponding to a noninterrogated component in row with the interrogated component, the diode 15′ is back biased by the voltage source 24′. During interrogation, with both the column and row switches 16′ and 19′ closed, a forward bias voltage is applied across the photosensitive component 10′ for charging capacitor 14′, the current path being completed through legs 1 and 4. This current is sensed by the current detector elements 30 and 31 to generate an electrical video output signal that is a function of the average illumination of the photoconductor element 13′ over a frame period. For this condition, current flow through legs 2 and 3 is restricted by the current limiting resistors 23′ and 25′.

In order that the described system generate video output signals over a suitable dynamic range, i.e., that the image sensor matrix respond to light intensity variations that may be typically encountered, the following characteristics of the photosensitive components are required: 1. $R_dC>>T_f$, where $R_dC$ is the time constant of the discharge path for the photosensitive component capacitor in the absence of light, or for a dark condition, and $Tf$ is a single frame time. A time constant at least ten times the frame time would be desirable 2. $R1C \cong Tf$, where $R_lC$ is the time constant of the capacitor discharge path for a light illumination of intermediate intensity.

In one operable embodiment of the circuit of FIG. 2 the following circuit components and parameters were employed, these being given solely for the purpose of example and not intended to be limiting:

| | |
|---|---|
| Transistors 16 | Type 2N2924 |
| Transistors 19 and 21 | Type 2N3638 |
| Diode 15 | Type 1N4444 |
| Photoconductor 13 | (1, 2) |
| Capacitor 14, picofarads | 100 |
| Resistors 23 and 25, ohms | 100K |
| Resistor 27, ohms | 200 |
| Resistor 28, ohms | 24 |
| Voltage sources 24 and 26, volts | 2 DC |
| Voltage source 29, volts | 6 DC |

[1] Dark impedance approximately $3\times10^{12}$ ohms.
[2] Light impedance approximately $3\times10^{8}$ ohms.

Figure 6B:
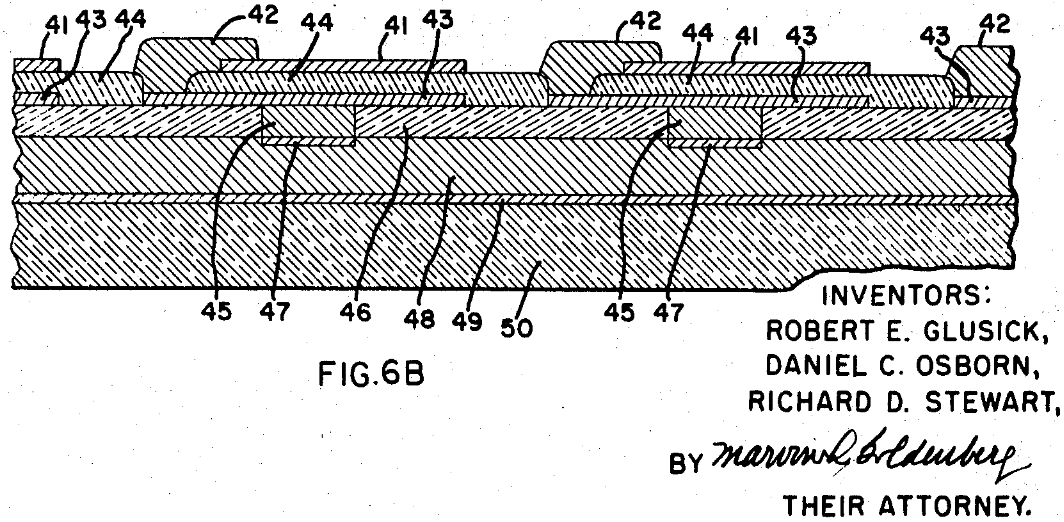
FIG. 6B is a cross-sectional view of FIG. 6A taken along the lines 6B—6B.

In FIG. 6A there is shown in plan view an exemplary image sensor matrix wafer structure. In the figure only a limited number of photosensitive components 40 are included. For purposes of clarity, the drawing is not to scale. Typically the components 40 are on 20 mil centers. Electrodes 41 overlay the components 40 in parallel strips and correspond to the row conductors in FIG. 2. Islands 42 of photoconductive material, such as cadmium selenide, are sputtered through a mask at each component site so as to contact the electrodes 41 and underlying electrodes 43, shown in the cross-sectional view of FIG. 6B taken along the lines 6B–6B in FIG. 6A, thereby forming the photoconductor elements. The electrode 43 is of approximately square configuration, there being one such electrode for each photosensitive component. Electrodes 41 and 43 are typically of platinum and have a thickness of about 1,000 to 2,000 A. A layer of dielectric material 44, for example $SiO_2$, extends between the electrodes 41 and 43 and together therewith forms the capacitor element of each photosensitive component electrically connected in shunt with the photoconductor element. The layer 44 is typically formed by a vapor reaction process to a thickness of about 2,000 A. Circular electrodes 45 are embedded at each photosensitive component site in etched out openings in a continuous layer of dielectric material 46, which also may be $SiO_2$ having a thickness of about 16,000 A. The circular electrodes 45, typically of gold, are shown in dotted outline in FIG. 6A. As shown in FIG. 6B, the circular electrodes 45 contact the square electrodes 43 and *p* regions 47 which compose individual anodes of the diode elements. In fabrication, the square electrodes 43 are deposited on the thick dielectric layer 46 and the dielectric layer 44 is deposited as a continuous layer over the electrodes 43 and layer 46. The dielectric layer 44 is then etched along parallel lines in the direction of the row conductors down to the electrodes 43, the formed crevices being filled by the photoconductive material.

The *p regions 47 are diffused into an n* region 48, commonly of silicon. The *n* region 48 is formed as parallel strips, separated by strips of insulating material, extending in a direction orthogonal to the conducting electrodes 41. Each *n*-type strip forms the cathodes for a plurality of diode elements arranged in column. On the under surface of the *n*-type strips are contacted corresponding strip electrodes 49, which correspond to the column conductors in FIG. 2. The entire matris structure is supported on a base substrate 50, which is typically a ceramic material.

The invention has been described in detail with respect to one exemplary embodiment for the purpose of clear and complete disclosure. It is recognized that numerous modifications and variations may be made with respect to the described embodiment which would fall within the concepts of the invention and are intended to be included in the appended claims. For example, a single photosensitive element having both the proper capacitive and photoconducting properties may be employed in lieu of the illustrated and described discrete photoconductor and capacitor elements. Thus, a highly capacitive photoconductor element with relatively little series resistance may be used. In addition, a photodiode or phototransistor may be employed in lieu of the photoconductor element, there being existing types of each which are known to have the requisite properties. The system may respond to the nonvisible as well as the visible portion of the spectrum, as a function of the light responsive characteristics of the photosensitive elements employed.

As a further modification, the image sensor matrix can be arranged so that the capacitor of the photosensitive component is charged during noninterrogation periods as a function of the applied light intensity and discharged upon interrogation. The operation is otherwise comparable to that described herein.

These and other modifications that may reasonably be considered to fall within the true scope of the invention are intended to be included within the meaning of the appended claims.

We claim:

1. An image converter system comprising:

a. an array of nonlinear photosensitive means having charge storage properties, each means including at least;
   1. a photosensitive element exhibiting an impedance that is a function of applied light energy so as to correspondingly vary the charge storage properties of said element, and
   2. a nonlinear semiconductor element serially connected to said photosensitive element, said nonlinear element being normally biased into a nonconducting state; and b. interrogation means for sequentially interrogating said photosensitive elements so as to generate an electrical output signal that is a function of the elements' charge storage properties, said interrogation means sequentially biasing into a conducting state the nonlinear elements serially connected to said interrogated photosensitive elements.

2. An image converter system as in claim 14 wherein stored charge within said photosensitive means varies from a relatively fixed level to a second level that is a function of the applied light energy during relatively long noninterrogation periods, and wherein said interrogation means includes a low impedance path for providing interrogation of said photosensitive means by abruptly restoring the charge to said relatively fixed level during extremely short interrogation periods.

3. An image converter system as in claim 2 wherein stored charge within said photosensitive means is dissipated as a function of said applied light energy during noninterrogation periods, and which includes a first voltage source coupled to said low impedance path for providing storage of an amount of charge substantially equal to the charge dissipated during said interrogation periods.

4. An image converter system as in claim 3 which includes detecting means for detecting the amount of charge stored within each photosensitive means during said interrogation periods.

5. An image converter system as in claim 4 wherein said array is a two dimensional matrix including a first plurality of row conductors and a second plurality of column conductors intersecting said row conductors, said photosensitive means individually connected between said row and column conductors at the intersections thereof, and wherein said low impedance path is sequentially completed through said photosensitive means by semiconductor switches connected to one end of each of said row and column conductors.

6. An image converter system as in claim 5 wherein said semiconductor switches are sequentially operated so as to scan said photosensitive means along rows thereof, the semiconductor switches connected to said column conductors being constructed for extremely fast closing operation and relatively slow opening operation.

7. An image converter system as in claim 6 wherein a second voltage source is connected to the other end of each of said row conductors and a third voltage source is connected to the other end of said column conductors, said first, second and third voltage sources applying a backward bias voltage to said nonlinear semiconductor elements during noninterrogation periods and applying a forward bias voltage to said nonlinear semiconductor elements during interrogation periods.

8. An image converter system as in claim 7 wherein said detecting means includes a semiconductor device coupled to said low impedance path and in a current steering relationship with the semiconductor switches connected to one group of said conductors so that current flowing through said semiconductor device is reciprocally related to the charge stored by said photosensitive means during said interrogation periods.

9. An image converter system as in claim 8 wherein said photosensitive elements each include the shunt connection of a photoconductor and a capacitor and said nonlinear element is a diode.

10. An image converter system as in claim 9 wherein the matrix of photosensitive elements is fabricated to form a wafer which includes a layer of dielectric material having discrete conductive regions through the thickness thereof for making external contact, island electrodes overlaying said conductive regions, a further continuous dielectric layer overlaying said island electrodes having electrode strips deposited thereon so as to form a plurality of capacitor elements with common connections provided by said electrode strips, crevices formed within said further dielectric layer along said electrode strips filled with photoconductive material which contacts said strip and island electrodes.

11. An image sensor matrix structure comprising:

a. a wafer of photosensitive elements which includes;

b. a layer of dielectric material having discrete conductive regions through the thickness thereof for making external contact;

c. island electrodes overlaying said conductive regions;

d. a further continuous dielectric layer overlaying said island electrodes having electrode strips deposited thereon so as to form a plurality of capacitor elements with common connections provided by said electrode strips; and e. crevices formed within said further dielectric layer along said electrode strips filled with a photoconductive material which contacts said strip and island electrodes.

12. An image sensor matrix structure as in claim 11 wherein said conductive regions make integral contact with an array of semiconductor diode elements which are arranged in columns orthogonally disposed with respect to said electrode strips.